United States Patent
Flakus

Patent Number: 5,087,647
Date of Patent: Feb. 11, 1992

[54] TWO-COMPONENT SYSTEMS BASED ON EPOXIDES AND DIAMINES

[75] Inventor: Werner Flakus, Recklinghausen, Fed. Rep. of Germany

[73] Assignee: Huels Aktiengesellschaft, Marl, Fed. Rep. of Germany

[21] Appl. No.: 372,324

[22] Filed: Jun. 28, 1989

[30] Foreign Application Priority Data

Jul. 29, 1988 [DE] Fed. Rep. of Germany ....... 3825754

[51] Int. Cl.$^5$ .................. C08K 5/04; C08L 33/10; C08L 33/12; C08L 33/26
[52] U.S. Cl. .................................. 523/412; 523/423; 523/414
[58] Field of Search ................ 523/412, 423, 414, 417

[56] References Cited

U.S. PATENT DOCUMENTS

| | | | |
|---|---|---|---|
| 4,096,105 | 6/1978 | McGinniss | 523/420 |
| 4,477,610 | 10/1984 | Ishimura et al. | 523/414 |
| 4,647,604 | 3/1987 | Kempter et al. | 523/402 |
| 4,865,704 | 9/1989 | Saatweber et al. | 523/411 |
| 4,886,845 | 12/1989 | Becker et al. | 523/403 |

*Primary Examiner*—Paul R. Michl
*Assistant Examiner*—Christopher P. Rogers
*Attorney, Agent, or Firm*—Oblon, Spivak, McClelland, Maier & Neustadt

[57] ABSTRACT

Aqueous two-component systems based on epoxide resins and diamines, containing water in an amount of 1 to 20 wt. % which are prepared by mixing: (a) as a curing agent, a (cyclo)aliphatic di-primary-diamine having 2 to 12 carbon atoms, in homogeneous solution with 2–40 wt. % water, (b) as an epoxide resin component, (i) a polyglycide compound of a bisphenol, an aliphatic polyol, a polyether polyol, a dicarboxylic acid, or a mixture of these polyglycide compounds and (ii) a polyacrylate of a polyol or a polyether polyol, have a low water content, are cold-curable, yield elastic coatings with good solvent resistance, and may be applied in thick layers and with a high filler content. The systems may be used for coating inorganic and organic materials.

2 Claims, No Drawings

TWO-COMPONENT SYSTEMS BASED ON EPOXIDES AND DIAMINES

BACKGROUND OF THE INVENTION

1. Field of the Invention

The present invention relates to two-component systems based on amines and epoxides, a method of preparing such two-component systems, and a method of coating articles with such two-component systems.

2. Discussion of the Background

Known two-component amine/epoxide systems emulsified in water, i.e. which form oil-in-water emulsions, after mixing of amine emulsions and epoxide emulsions, physically dry in a reasonable time at ambient temperature and chemically cure. Cold-cured coatings are evaluated based on the characteristics of films attainable by hot curing.

Currently attainable coatings produced by cold-curing of commercially available aqueous amine/epoxide emulsions are satisfactory, and some are even good. The advantage they offer in substituting water for organic solvents are evident.

However, a disadvantage of such systems is their high water content, which is commonly 50 wt. %, but ranges from 35 wt. % to more than 70 wt. %. This large amount of water generally must be evaporated without heating. This evaporation can be time-consuming, particularly in the event of low ambient temperature and poor ventilation. Frequently, residual water may remain in the cured film or on the substrate, which causes problems.

Another disadvantage of the known systems is that, when pigmented formulations are employed, loss of gloss and irregularities in the gloss of the surface occur, because of the wide range of water content. In addition, the elasticity and solvent resistance of the cold-cured films or coatings are reduced as the water content of the initial emulsion is increased. Furthermore, it is known that it is not possible to achieve thick film coatings with a high water content or a high solvent content.

The epoxide compounds which are suitable for use in these emulsions are relatively insoluble in water and can be easily emulsified in water, e.g., with the aid of nonionic emulsifiers. Polyamines are in general water soluble; thus they readily form aqueous solutions. However, they do not form emulsions in water; in fact, for example, they break up epoxide emulsions and cause phase separation.

In order to form emulsions of amines, the amines must be hydrophobized, i.e., they must be chemically transformed to relatively insoluble products.

Such insoluble products may be produced from amines by addition, condensation, or substitution reactions. The resulting reaction products of the polyamines are relatively water-insoluble, and are emulsifiable, but are of a consistency which makes it necessary to employ a low content of resin, i.e., a high water content, which, as discussed above, results in detrimental effects. In particular, a high water content makes it impossible to achieve a high coating density with a flowable coating.

Thus, there remains a need for aqueous emulsions based on amines and epoxides, which have a low water content and which are cold curable, can be applied in thick layers with a high filler content, and yield elastic coatings with good solvent resistance.

SUMMARY OF THE INVENTION

Accordingly, it is an object of the present invention to provide aqueous emulsions based on amines and epoxides which have a low water content.

It is another object of the present invention to provide aqueous emulsions based on amines and epoxides which are cold-curable and yield elastic coatings which have good solvent resistance.

It is another object of the present invention to provide aqueous emulsions based on amines and epoxides which can be applied in thick layers and with a high filler content.

These and other objects have been achieved by aqueous emulsions which contain 1 to 20 wt. % of water. The present emulsions contain (a) a curing agent (or hardener) comprised of a polyamine, preferably a primary, nonaromatic diamine, or a mixture of amines, which are non-hydrophobized, and present in homogeneous solution with 2–40 wt. % water, and (b) an epoxide resin preparation containing a polyglycide compound of: a bisphenol, an aliphatic polyol, a polyether polyol, or a dicarboxylic acid, or mixtures of these compounds, and a polyacrylate of a polyol or a polyether polyol.

Surprisingly, the emulsions of the present invention are cold-curable, and yield elastic coatings which have good solvent resistance. Moreover, the described systems can be applied in thick layers and with a high filler content.

DETAILED DESCRIPTION OF THE PREFERRED EMBODIMENTS

The epoxide resin preparations may suitably contain, e.g., diglycides, e.g.: diglycides of bisphenol A (condensation product of acetone and phenol) and bisphenol F (condensation product of formaldehyde and phenol); diglycides of dicarboxylic acids; or diglycides of diols, particularly of polyether diols, wherewith the diglycides are mixed with, e.g., diol diacrylates or polyetherdiol diacrylates but are free of water or surfactants. Instead of diglycides, the epoxide preparation may alternatively contain triglycides or mixtures of triglycides, e.g., trimethylolpropane triglycide; and, instead of diacrylates (such as tripropylene glycol diacrylate), may contain triacrylates (e.g., trimethylolpropane triacrylate) or mixtures of triacrylates.

The water-containing diamine solutions and the acrylate-containing polyglycide solutions are storage-stabile, entirely physical mixtures of the components.

Accordingly, the present invention includes two-component systems based on epoxides and diamines, containing water in the amount of 1 to 20 wt. % as a curing agent, and optionally containing various conventional additives; containing:

(Cyclo)aliphatic di-primary-diamines having 2 to 12 C atoms, or mixtures of these, in homogeneous solution with 2 to 40 wt. % water; and polyglycide compounds of: bisphenols, aliphatic polyols, polyether polyols, or dicarboxylic acids, or mixtures of these polyglycide compounds, wherewith these polyglycide compounds are paired with polyacrylates of polyols or polyether polyols.

The present invention further includes a method of preparing the two-component systems based on epoxides and diamines, which contain water in an amount of 1 to 20 wt. % as a curing agent; which is characterized in that the following are thoroughly intermixed at room temperature in the absence of catalysts:

(cyclo)aliphatic di-primary-diamines having 2 to 12 C atoms, or mixtures of these, in homogeneous solution with 2 to 40 wt. % water;

polyglycide compounds of bisphenols, aliphatic polyols, polyether polyols, or dicarboxylic acids; or mixtures of these polyglycide compounds, wherewith these polyglycide compounds are paired with polyacrylates of polyols or polyether polyols, as resin components; and optionally, conventional additives.

Amine components and acrylate components are brought to reaction in equivalent ratios of about 1:1, and the same ratio is employed for amine components and glycide components.

Preferably, the proportions for mixing and reaction are: about 4n+4 equivalents diamine; about 2n equivalents polyacrylates; and about 2n+4 equivalents polyglycides; where n=1 to 6, and where a di-primary-amine has 4 reactive hydrogen atoms and thus 4 equivalents per mole and a diglyceride and a diacrylate both have 2 equivalents per mole.

Only after the aqueous amine curing agent and the polyacrylate-containing polyepoxide resin are mixed are the water-in-oil emulsions ("W-O systems") formed and do the reactants react. No external catalytic influence is involved in the curing of the epoxide. Surprisingly, this reaction is not adversely affected by the presence of water within the present range of water content, corresponding to the W-O systems, and in fact is substantially promoted. In the absence of water, the curing of the above-described mixtures does not proceed satisfactorily. If more than the present water content is employed, detrimental effects are experienced, in that the inventive W-O emulsion is converted to an O-W emulsion, which is accompanied by the disadvantages mentioned above.

The present inventive aqueous amine/epoxide two-component systems are improvements over the state of the art in the following respects:

Lower water content of the reaction mixture. The water content is less than 20 wt. %, as compared with 30 or 50 wt. % or more in conventional systems.

There are no chemical process steps in preparing the curing agent.

Solvents which can evaporate are eliminated, as are catalysts and emulsifiers which persist in the system.

High gloss surfaces can be obtained with, e.g., white pigments.

As a consequence of the low viscosity of the resin components, and the low water content of the mixture, flowable coating materials can be formulated which have a high filler content and produce a high coating thickness dimension.

By cold curing with the present aqueous amine/epoxide systems, coatings can be achieved which have the same or nearly the same characteristics as hot-cured coatings (e.g., coatings cured 60 min at 120° C.).

According to the present invention, one may employ, e.g., nonaromatic diamines, i.e., diamines of aliphatic, cyclic, and cycloaliphatic structures, or mixtures of these, provided that the substances have di-primary NH$_2$ equivalents and are water soluble. Particularly suitable are molar mixtures of isophoronediamine and 2,2,4- and 2,4,4-trimethyl-1,6-hexanediamine. Other suitable diamines are, e.g., 2-methyl-1,5-pentanediamine and 2-ethyl-1,4-butanediamine, particularly in combination with isophoronediamine.

All diglycides and triglycides, as well as their mixtures, may be used, according to the invention, to the extent that they are liquid at room temperature. Particularly suitable are diglycides of bisphenols, or mixtures of these with trimethylolpropane triglycide, with the latter present in the amount of 1 to 20 wt. %.

Diacrylates and triacrylates of aliphatic polyols and polyether polyols may be used according to the invention, particularly where the carbon chains of the diol components each have 5 to 20 C atoms. Particularly suitable are diacrylates, particularly tripropylene glycol diacrylate, or mixtures of these with trimethylolpropane triacrylate, with the latter present in the amount of 1 to 20 wt. %.

The aqueous amine/epoxide systems may contain additives in the form of pigments, fillers, mineral structural materials, and the like.

The present systems may be used, e.g., in coatings and adhesives for organic and inorganic materials, e.g. metals, plastics, or mineral surfaces.

Other features of the present invention will become apparent in the course of the following descriptions of exemplary embodiments which are given for illustration of the invention and are not intended to be limiting thereof.

EXAMPLES

Example 1

Clear varnish:

Epoxide resin:

480 0 g (1.27 mol) "MG 378" diglycide ether of bisphenol A.

479.5 g (1.37 mol) "MG 350" diglycide ether of bisphenol F.

104.9 g (0.24 mol) "MG 437" trimethylolpropane triglycide.

300.0 g (1.0 mol) tripropylene glycol diacrylate.

Total weight=1,364.4 g.

This resin was mixed with the following amine curing agent, and the mixture was tested as a coating on steel plates:

Amine curing agent:

170.0 g (1.0 mol) IPDA (isophoronediamine).

158.0 g (1.0 mol) TMDA (2,2,4- and 2,4,4-trimethyl-1,6-hexanediamine).

110.0 g water

Total weight of amine agent=438.0 g.

Water content of amine curing agent=25.1 wt. %.

Water content of reaction mixture=6.1 wt. %.

TABLE 1

| Test results on steel plates | | After 7 Days at 25° C. | After 1 hr. at 120° C. |
|---|---|---|---|
| Koenig pendulum hardness (sec), according to DIN 53 157 | 1st day | 86 | 195 |
|  | 3rd day | 189 |  |
|  | 7th day | 192 |  |
| Erichsen Penetration test, DIN 53 516 (mm) |  | >10.0 | >10.0 |
| Acetone resistance, rubbing test at 1 kg/cm$^2$ (cycles) |  | >100 | >100 |
| Xylene resistance, rubbing test at |  | >100 | >100 |

Example 2

Clear varnish

Epoxide resin:
567.0 g (1.5 mol) "MG 378" diglycide ether of bisphenol A.
525.5 g (1.5 mol) "MG 350" diglycide ether of bisphenol F.
119.0 g (0.4 mol) trimethylolpropane triacrylate.
120.0 g (0.4 mol) tripropylene glycol diacrylate.
Total weight = 1,331.5 g.
This resin was mixed with the following amine curing agent, and the mixture was tested as a coating on steel plates:
Amine curing agent:
170.0 g (1.0 mol) IPDA.
158.0 g (1.0 mol) TMDA.
110.0 g water.
Total weight of amine agent = 438.0
Water content of amine curing agent = 25.1 wt. %
Water content of reaction mixture = 6.2 wt. %

TABLE 2

| | Test results on steel plates | | |
| --- | --- | --- | --- |
| | | After 7 Days at 25° C. | After 1 hr. at 120° C. |
| Koenig pendulum hardness (sec), according to DIN 53 157 | 1st day | 84 | 205 |
| | 3rd day | 186 | |
| | 7th day | 201 | |
| Erichsen Penetration test, DIN 53 516 (mm) | | 10.0 | 10.0 |
| Acetone resistance, rubbing test at 1 kg/cm² (cycles) | | >100 | >100 |
| Xylene resistance, rubbing test at 1 kg/cm² (cycles) | | >100 | >100 |

Example 3

Clear varnish

Epoxide resin:
793.8 g (2.1 mol) diglycide ether of bisphenol A.
270.0 g (0.9 mol) 2,2,4- and 2,4,4-trimethyladipic acid, glycide ester.
300.0 g (1.0 mol) tripropylene glycol diacrylate.
Total weight = 1,363.8 g.
This resin was mixed with the following amine curing agent, and the mixture was tested as a coating on steel plates:
Amine curing agent:
340.0 g (2.0 mol) IPDA.
113.0 g water.
Total weight of amine agent = 453.0 g.
Water content of amine curing agent = 25.0 wt. %.
Water content of reaction mixture = 6.2 wt. %.

TABLE 3

| | Test results on steel plates | | |
| --- | --- | --- | --- |
| | | After 7 Days at 25° C. | After 1 hr. at 120° C. |
| Koenig pendulum hardness (sec), according to DIN 53 157 | 1st day | 93 | 204 |
| | 3rd day | 200 | |
| | 7th day | 219 | |
| Erichsen Penetration test, DIN 53 516 (mm) | | >10.0 | 9.8 |
| Acetone resistance, rubbing test at 1 kg/cm² (cycles) | | 90 | >100 |
| Xylene resistance, rubbing test at 1 kg/cm² (cycles) | | 100 | >100 |

Example 4

Clear varnish

Epoxide resin:
2,268 g (6 mol) diglycide ether of bisphenol A.
1,200 g (4 mol) tripropylene glycol diacrylate.
Total weight = 3,468 g.
This resin was mixed with the following amine curing agent, and the mixture was treated as a coating on steel plates:
Amine curing agent:
790 g (5.0 mol) TDMA.
180 g water.
Total weight of amine agent = 970 g.
Water content of amine curing agent = 18.6 wt. %.
Water content of reaction mixture = 4.1 wt. %.

TABLE 4

| | Test results on steel plates | | |
| --- | --- | --- | --- |
| | | After 7 Days at 25° C. | After 1 hr. at 120° C. |
| Koenig pendulum hardness (sec), according to DIN 53 157 | 1st day | 80 | 213 |
| | 3rd day | 163 | |
| | 7th day | 200 | |
| Erichsen Penetration test, DIN 53 516 (mm) | | >10.0 | >10.0 |
| Acetone resistance, rubbing test at 1 kg/cm² (cycles) | | >100 | >100 |
| Xylene resistance, rubbing test at 1 kg/cm² (cycles) | | 100 | >100 |

Example 5

Clear varnish

Epoxide resin:
1,063 g Ruetapox VE 2913 ® polyglycide (supplied by the firm Bakelite) (epoxide equivalent = 177).
300 g (1 mol) tripropylene glycol diacrylate.
Total weight = 1,363 g.
This resin was mixed with the following amine curing agent, and the mixture was tested as a coating on steel plates:
Amine curing agent:
170.0 g (1.0 mol) IPDA.
158.0 g (1.0 mol) TMDA.

157.0 g water.
Total weight of amine agent = 485.0 g.
Water content of amine curing agent = 32.4 wt. %
Water content of reaction mixture = 8.5 wt. %.

TABLE 5

| Test results on steel plates | | After 7 Days at 25° C. | After 1 hr. at 120° C. |
|---|---|---|---|
| Koenig pendulum hardness (sec), according to DIN 53 157 | 1st day | 94 | 207 |
| | 3rd day | 185 | |
| | 7th day | 202 | |
| Erichsen Penetration test, DIN 53 516 (mm) | | >10.0 | >10.0 |
| Acetone resistance, rubbing test at 1 kg/cm² (cycles) | | >100 | >100 |
| Xylene resistance, rubbing test at 1 kg/cm² (cycles) | | >100 | >100 |

Example 6

White paint formulation

Epoxide resin:
567 g (1.5 mol) "MG 378" diglycide ether of bisphenol A.
525 g (1.5 mol) "MG 350" diglycide ether of bisphenol F.
300 g (1.0 mol) tripropylene glycol diacrylate.
3,096 g "Kronos Cl 310".
Total weight = 4,488 g.

This resin was dispersed and mixed with the following amine curing agent, and the mixture was tested as a coating on steel plates:
Amine curing agent:
170 g (1 mol) IPDA.
158 g (1 mol) TMDA.
70 g water.
Total weight of amine agent = 398 g.
Water content of amine curing agent = 17.6 wt. %
Water content of reaction mixture = 1.4 wt. %
Pot time = >4 hours
Pigment-Volume-Concentration (PVK) = 30.

TABLE 6

| Test results on steel plates | | After 7 Days at 25° C. | After 1 hr. at 120° C. |
|---|---|---|---|
| Koenig pendulum hardness (sec), according to DIN 53 157 | 1st day | 80 | 155 |
| | 3rd day | 166 | |
| | 7th day | 173 | |
| Erichsen Penetration test, DIN 53 516 (mm) | | 0.9 | 6.4 |
| Gardner Gloss at 20° C. | | 75 | 69 |
| Gardner Gloss at 60° C. | | 90 | 89 |
| Gardner Gloss at 85° C. | | 96 | 91 |

Example 7

Self-flowing coating composition

Epoxide resin:
567 g (1.5 mol) diglycide ether of bisphenol A.
525 g (1.5 mol) diglycide ether of bisphenol F.
300 g (1.0 mol) tripropylene glycol diacrylate.
2,102 g ground shale (DIN 70).
Total weight = 3,494 g.

To this resin the following amine curing agent was added:
Amine curing agent:
170 g (1 mol) IPDA.
158 g (1 mol) TMDA.
70 g water.
Total weight of amine agent = 398 g.
Water content of amine curing agent = 17.6 wt. %.
Water content of reaction mixture = 1.8 wt. %.
Resin content following curing = 45 wt. %.
Content of ground shale following curing = 55 wt. %.
Pot time = 4 to 6 hours.

For coatings having thickness in the range of 3 to 20 mm, the flowability was good, and the curing was rapid and bubble-free and occurred within 12 to 16 hr.

Example 8

Reactive resinous concrete

Epoxide resin:
567 g (1.5 mol) diglycide ether of bisphenol A.
525 g (1.5 mol) diglycide ether of bisphenol F.
300 g (1.0 mol) tripropylene glycol diacrylate.
Total weight = 1,392 g.

This resin was mixed with the following amine curing agent:
Amine curing agent:
170 g (1 mol) IPDA.
158 g (1 mol) TMDA.
111 g water.
Total weight of amine agent = 439 g.
Then 32,680 g silver sand and 1,376 water were added, with stirring.
Water content of amine curing agent = 25.3 wt. %.
Water content of total mixture = 4.1 wt. %.
Resin content following curing = 5.0 wt. %.
Content of silver sand following curing = 95.0 wt. %.

After 12 to 16 hours molded pieces were produced which could be removed from the mold without damage, and after 7 days the pieces were finished elements having substantial impact strength.

Obviously, numerous modifications and variations of the present invention are possible in light of the above teachings. It is therefore to be understood that, within the scope of the appended claims, the invention may be practice otherwise than as specifically described herein.

What is claimed as new and desired to be secured by Letters Patent of the United States is:

1. A method of coating a material, comprising the steps of:
   (1) providing a first component, which is a curing agent, comprising a (cyclo)aliphatic di-primary-diamine having 2 to 12 carbon atoms, dissolved in 2 to 40 wt. % water;
   (2) providing a second component, which is an epoxy resin component, comprising a mixture of
      (i) at least one compound selected from the group consisting of a polyglycide of a bisphenol, a polyglycide of an aliphatic polyol, a polyglycide of a polyester polyol and a polyglycide of a dicarboxylic acid, and
      (ii) a polyacrylate of a polyol or a polyacrylate of a polyether polyol;

(3) admixing said first component and said second component to form a water-in-oil emulsion wherein the total amount of water is 1 to 20 wt. %;
(4) coating said material with said so-formed emulsion to form a coating layer; and
(5) curing said coating layer.

2. The method of claim 1, wherein said material is selected from the group consisting of metals, plastics and minerals.

* * * * *